United States Patent
Aso et al.

(10) Patent No.: US 11,811,265 B2
(45) Date of Patent: Nov. 7, 2023

(54) MOTOR, FAN, AIR CONDITIONER, AND MANUFACTURING METHOD OF MOTOR

(71) Applicant: Mitsubishi Electric Corporation, Tokyo (JP)

(72) Inventors: Hiroki Aso, Tokyo (JP); Takaya Shimokawa, Tokyo (JP); Ryogo Takahashi, Tokyo (JP); Kazuma Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 199 days.

(21) Appl. No.: 17/433,727

(22) PCT Filed: Mar. 4, 2019

(86) PCT No.: PCT/JP2019/008267
§ 371 (c)(1),
(2) Date: Aug. 25, 2021

(87) PCT Pub. No.: WO2020/178927
PCT Pub. Date: Sep. 10, 2020

(65) Prior Publication Data
US 2022/0200364 A1  Jun. 23, 2022

(51) Int. Cl.
*H02K 1/04* (2006.01)
*H02K 1/18* (2006.01)
(Continued)

(52) U.S. Cl.
CPC .............. *H02K 1/04* (2013.01); *H02K 1/18* (2013.01); *H02K 1/27* (2013.01); *H02K 5/08* (2013.01)

(58) Field of Classification Search
CPC ............ H02K 1/148; H02K 1/18; H02K 1/27; H02K 1/2706; H02K 1/272; H02K 1/274; H02K 1/04; H02K 5/08; H02K 2213/03
(Continued)

(56) References Cited

U.S. PATENT DOCUMENTS

2015/0340914 A1* 11/2015 Asakura ................. H02K 21/16
                                                        310/208
2019/0036385 A1*  1/2019 Oikawa ................ H02K 1/2746
2019/0386530 A1* 12/2019 Takahashi ............ H02K 1/2746

FOREIGN PATENT DOCUMENTS

JP          2008-109848 A       5/2008
JP         2008109848 A   *    5/2008
(Continued)

OTHER PUBLICATIONS

Machine translation of JP-2014027827-A. (Year: 2014).*
(Continued)

*Primary Examiner* — Michael Andrews
(74) *Attorney, Agent, or Firm* — POSZ LAW GROUP, PLC

(57) ABSTRACT

A motor includes an annular stator core having a plurality of core segments connected via connecting portions in a circumferential direction about an axis, a cover portion covering the stator core and having a core-surrounding portion surrounding the stator core from an outer side in a radial direction about the axis, and a rotor having a rotor core provided on an inner side of the stator core in the radial direction and a magnet attached to the rotor core. The magnet forms a first magnetic pole, and a part of the rotor core forms a second magnetic pole. A minimum distance R1 in the radial direction from the axis to an outer circumference of the core-surrounding portion and a minimum distance R2 in the radial direction from the axis to an outer circumference of the stator core satisfy R1≥1.15×R2.

18 Claims, 13 Drawing Sheets

(51) Int. Cl.
*H02K 1/27* (2022.01)
*H02K 5/08* (2006.01)

(58) Field of Classification Search
USPC ...................................................... 310/43, 89
See application file for complete search history.

(56) References Cited

FOREIGN PATENT DOCUMENTS

| | | | |
|---|---|---|---|
| JP | 2014-027827 A | | 2/2014 |
| JP | 2014027827 A | * | 2/2014 |
| WO | 2017/183162 A1 | | 10/2017 |

OTHER PUBLICATIONS

Machine translation of JP-2008109848-A. (Year: 2008).*
International Search Report dated May 21, 2019, issued in corresponding International Application No. PCT/JP2019/008267 (and English Machine Translation).
Japanese Office Action dated Mar. 11, 2022 in corresponding Japanese Application No. 2021-503276 (with machine translation).
Office Action dated Oct. 4, 2022 in connection with counterpart Japanese Patent Application No. 2021-503276 (and English machine translation).

* cited by examiner

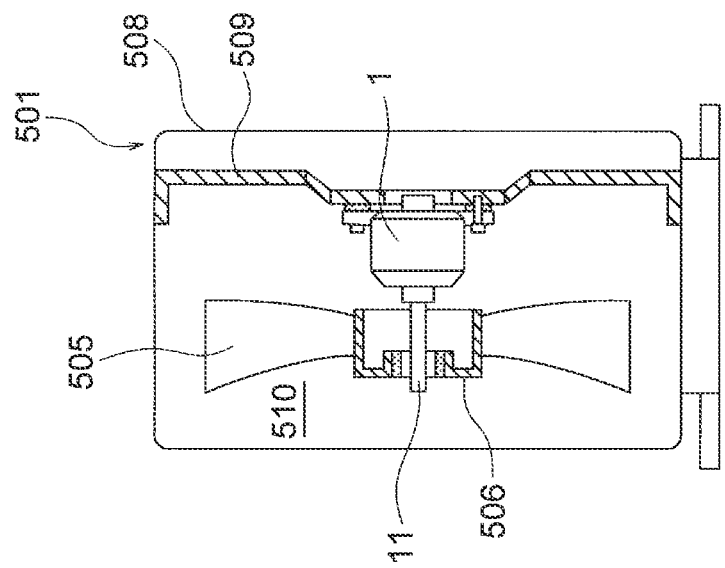
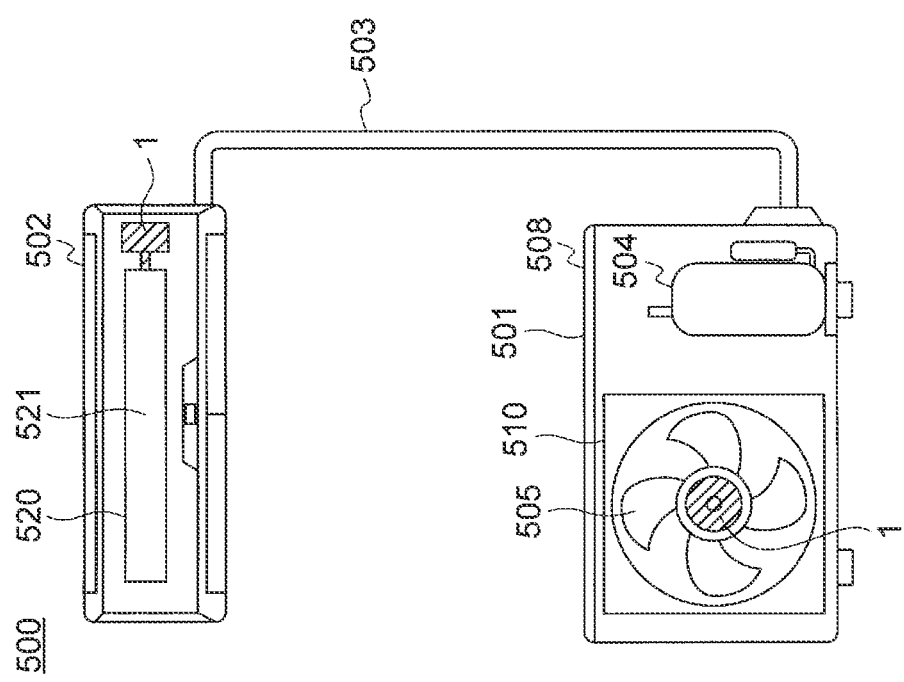
FIG. 15(A)
FIG. 15(B)

MOTOR, FAN, AIR CONDITIONER, AND MANUFACTURING METHOD OF MOTOR

CROSS REFERENCE TO RELATED APPLICATION

This application is a U.S. National Stage Application of International Patent Application No. PCT/JP2019/008267 filed on Mar. 4, 2019, the disclosure of which is incorporated herein by reference.

TECHNICAL FIELD

The present invention relates to a motor, a fan, an air conditioner, and a manufacturing method of the motor.

BACKGROUND

The motor includes a rotor having a rotor core to which a magnet is attached, and also includes a stator surrounding the rotor. In recent years, a consequent pole type rotor including a first magnetic pole constituted by a magnet and a second magnetic pole constituted by a part of a rotor core has been developed (see, for example, Patent Reference 1).

PATENT REFERENCE

[Patent Reference 1]
International Publication WO 2017/183162 (see FIG. 1)

The consequent pole type rotor tends to have an outer diameter larger than that of a non-consequent pole type rotor, and thus the outer diameter of the stator tends to be large. Thus, when an output of a motor is increased, stiffness of the stator may be insufficient, and vibration and noise of the motor may increase.

SUMMARY

The present invention is made to solve the above described problem, and an object of the present invention is to reduce vibration and noise of a motor including a consequent pole type rotor.

A motor according to an aspect of the present invention includes an annular stator core having a plurality of core segments connected via connecting portions in a circumferential direction about an axis, a cover portion covering the stator core and having a core-surrounding portion surrounding the stator core from an outer side in a radial direction about the axis, and a rotor having a rotor core provided on an inner side of the stator core in the radial direction and a magnet attached to the rotor core. The magnet forms a first magnetic pole, and a part of the rotor core foams a second magnetic pole. A minimum distance R1 in the radial direction from the axis to an outer circumference of the core-surrounding portion and a minimum distance R2 in the radial direction from the axis to an outer circumference of the stator core satisfy R1≥1.15×R2.

According to the present invention, since the minimum distance R1 from the axis to the outer circumference of the core-surrounding portion and the minimum distance R2 from the axis to the outer circumference of the stator core satisfy R1≥1.15×R2, the cover portion can firmly hold the stator core. Accordingly, vibration and noise of the motor including the consequent pole type rotor can be reduced.

BRIEF DESCRIPTION OF THE DRAWINGS

FIG. 15(A) is a view illustrating an air conditioner to which a motor according to each embodiment is applicable and FIG. 15(B) is a sectional view illustrating an outdoor unit of the air conditioner.

DETAILED DESCRIPTION

Embodiments of the present invention will be described in detail with reference to the drawings. These embodiments are not intended to limit the present invention.

First Embodiment (Configuration of Motor 1)

Figure 1:
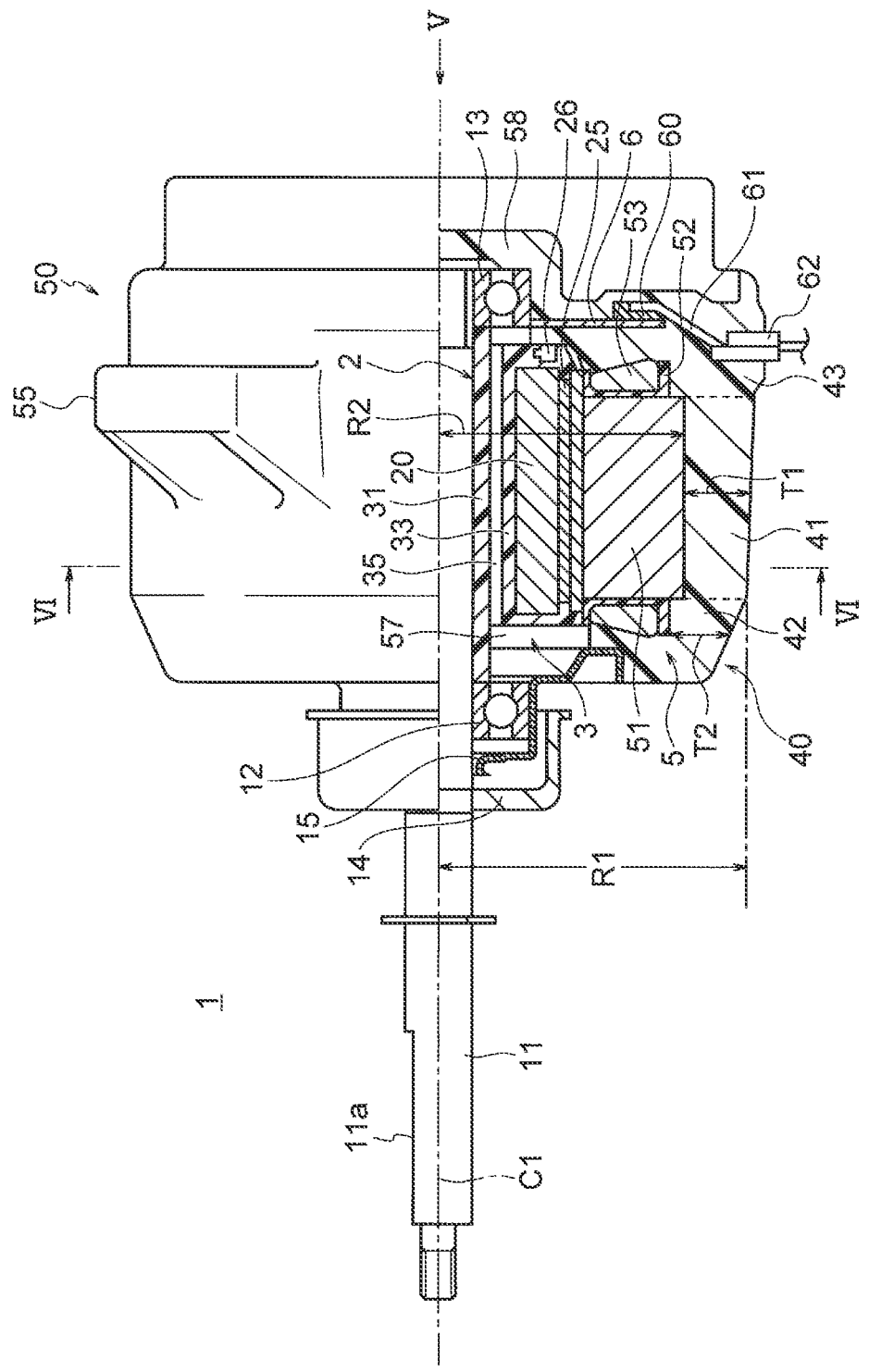
FIG. 1 is a partially longitudinal sectional view illustrating a motor in a first embodiment.

FIG. 1 is a partially longitudinal sectional view illustrating a motor 1 in a first embodiment. The motor 1 is, for example, a brushless DC motor for use in a fan of an air conditioner and driven by an inverter. The motor 1 is an interior permanent magnet (IPM) motor in which magnets 25 are embedded in a rotor 2.

The motor 1 includes the rotor 2 including a shaft 11 as a rotation shaft, and a mold stator 50 surrounding the rotor 2. The mold stator 50 includes a stator 5 provided to surround the rotor 2, and a cover portion 40 covering the stator 5.

In the following description, a direction of an axis C1 that is a center axis of the shaft 11 will be referred to as an "axial direction". A circumferential direction about the axis C1 will be described as a "circumferential direction" and indicated by an arrow S in FIG. 2 and other figures. A radial direction about the axis C1 will be referred to as a "radial direction". A sectional view in a plane parallel to the axial direction will be referred to as a "longitudinal sectional view" and a sectional view in a plane perpendicular to the axial direction will be referred to as a "transverse sectional view".

The shaft 11 projects from the mold stator 50 to the left in FIG. 1, and an impeller 505 (FIG. 15(A)) of a fan, for example, is attached to an attachment portion 11a formed at the projecting portion of the shaft 11. Thus, a projecting side of the shaft 11 will be referred to as a "load side" and the opposite side will be referred to as a "counter-load side".
(Configuration of Mold Stator 50)

As described above, the mold stator 50 includes the stator 5 and the cover portion 40. The stator 5 surrounds the rotor 2 from an outer side in the radial direction. The stator 5 includes a stator core 51, an insulating portion 52 provided on the stator core 51, and coils 53 wound on the stator core 51 via the insulating portion 52.

The cover portion 40 is formed of a thermosetting resin such as a bulk molding compound (BMC). The cover portion 40 may be formed of a thermoplastic resin such as polybutylene terephthalate (PBT) or polyphenylene sulfide (PPS). The cover portion 40 has attachment legs 55 at an outer circumference thereof. The attachment legs 55 are provided for attaching the motor 1 to an air conditioner.

The cover portion 40 has an opening 57 on the load side and a bearing support portion 58 on the counter-load side in the axial direction. The rotor 2 is inserted through the opening 57 into a hollow portion inside the mold stator 50. A metal bracket 15 is attached to the opening 57. The bracket 15 holds one bearing 12 supporting the shaft 11. A waterproof cap 14 for preventing intrusion of water or the like is attached to the outer side of the bracket 15. The bearing support portion 58 of the cover portion 40 has a cylindrical inner circumferential surface. The other bearing 13 supporting the shaft 11 is held on the inner circumferential surface of the bearing support portion 58.

Figure 2:
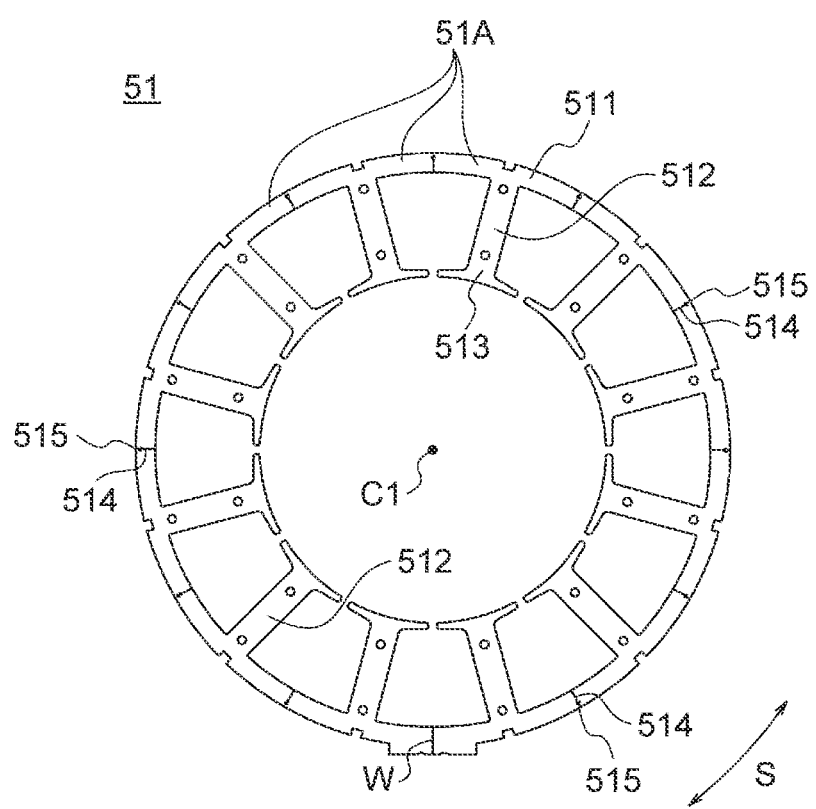
FIG. 2 is a plan view illustrating a stator core in the first embodiment.

FIG. 2 is a plan view illustrating the stator core 51. The stator core 51 is formed by stacking a plurality of stacking elements in the axial direction and integrally fixing the stacking elements by crimping, welding, bonding, or the like. The stacking elements are, for example, electromagnetic steel sheets. The stator core 51 includes a yoke 511 annularly extending in the circumferential direction about the axis C1 and a plurality of teeth 512 extending inward in the radial direction from the yoke 511. A tooth tip 513 on an inner side of each tooth 512 in the radial direction faces an outer circumferential surface of the rotor 2 (FIG. 1). The number of teeth 512 is 12 in this example, but is not limited to 12.

The stator core 51 has a structure divided into a plurality of core segments 51A each including one tooth 512. The core segments 51A are divided at split surfaces 514 foamed in the yoke 511. Each of the split surfaces 514 extends outward in the radial direction from an inner circumferential surface of the yoke 511. Thin-wall connecting portions, which are plastically deformable thin-wall portions, are formed between the terminal ends of the split surfaces 514 and an outer circumferential surface of the yoke 511.

Each of the thin-wall connecting portions 515 is a connecting portion connecting two of the core segments 51A adjacent to each other in the circumferential direction. That is, the stator core 51 has a structure in which the plurality of core segments 51A are connected in the circumferential direction via the thin-wall connecting portions 515. The stator core 51 can be extended in a band shape by plastic deformation of the thin-wall connecting portions 515.

In a state where the stator core 51 is extended in a band shape, the coils 53 can be wound around the teeth 512. After the winding of the coils 53 is completed, the band-shaped stator core 51 is bent in an annular shape, and end portions W of the stator core 51 are welded together. The connecting portions connecting the adjacent core segments 51A are not limited to the thin-wall connecting portions 515, and may be, for example, crimping portions.

With reference to FIG. 1 again, the insulating portion 52 is formed of, for example, a thermoplastic resin such as PBT. The insulating portion 52 is formed by molding the thermoplastic resin integrally with the stator core 51 or by assembling a molded body of the thermoplastic resin to the stator core 51.

The coils 53 are formed by winding magnet wires around the teeth 512 (FIG. 2) via the insulating portion 52. The insulating portion 52 has wall portions at the inner and outer sides of the coils 53 in the radial direction and guides the coils 53 from both sides in the radial direction.

A wiring board 6 is disposed on one side of the stator 5 in the axial direction. A driving circuit 60 such as a power transistor for driving the motor 1, a magnetic sensor and the like are mounted on the wiring board 6. Lead wires 61 are arranged on the wiring board 6. The lead wires 61 of the wiring board 6 are drawn out to the outside of the motor 1 through a lead-out portion 62 attached to an outer circumferential portion of the cover portion 40.

(Configuration of Rotor 2)

Figure 3:
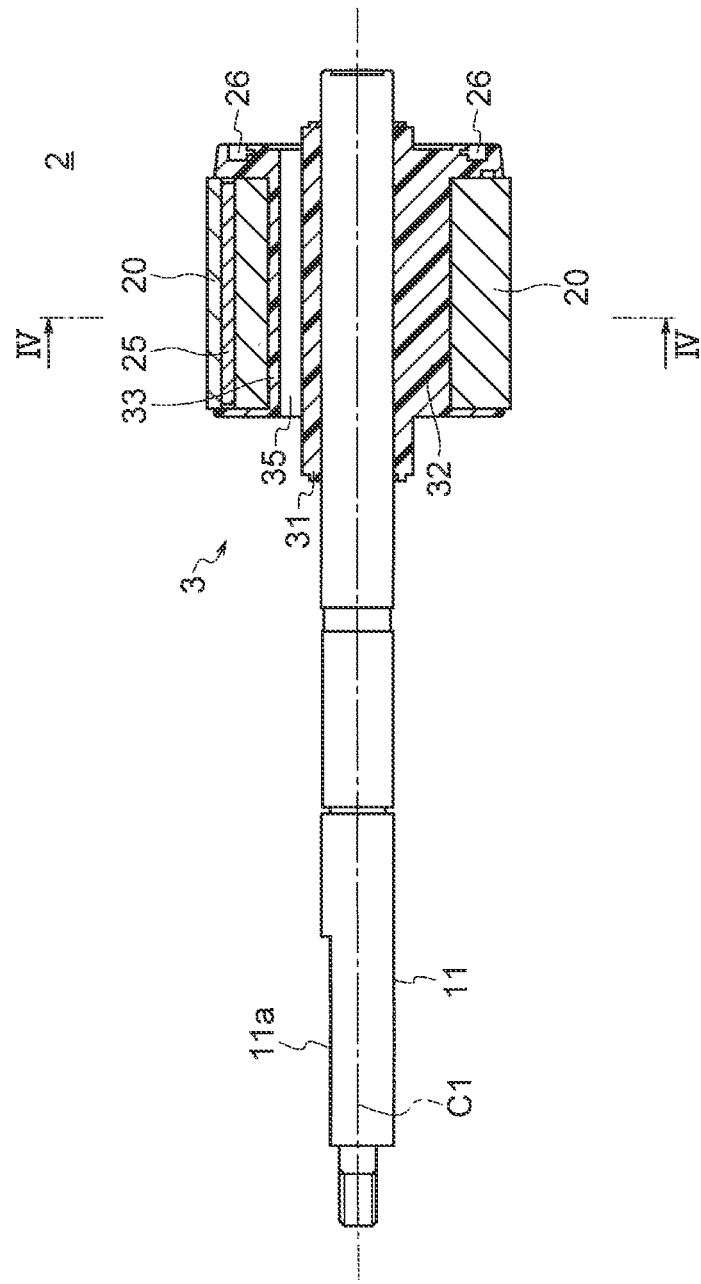
FIG. 3 is a longitudinal sectional view illustrating a rotor in the first embodiment.
Figure 4:
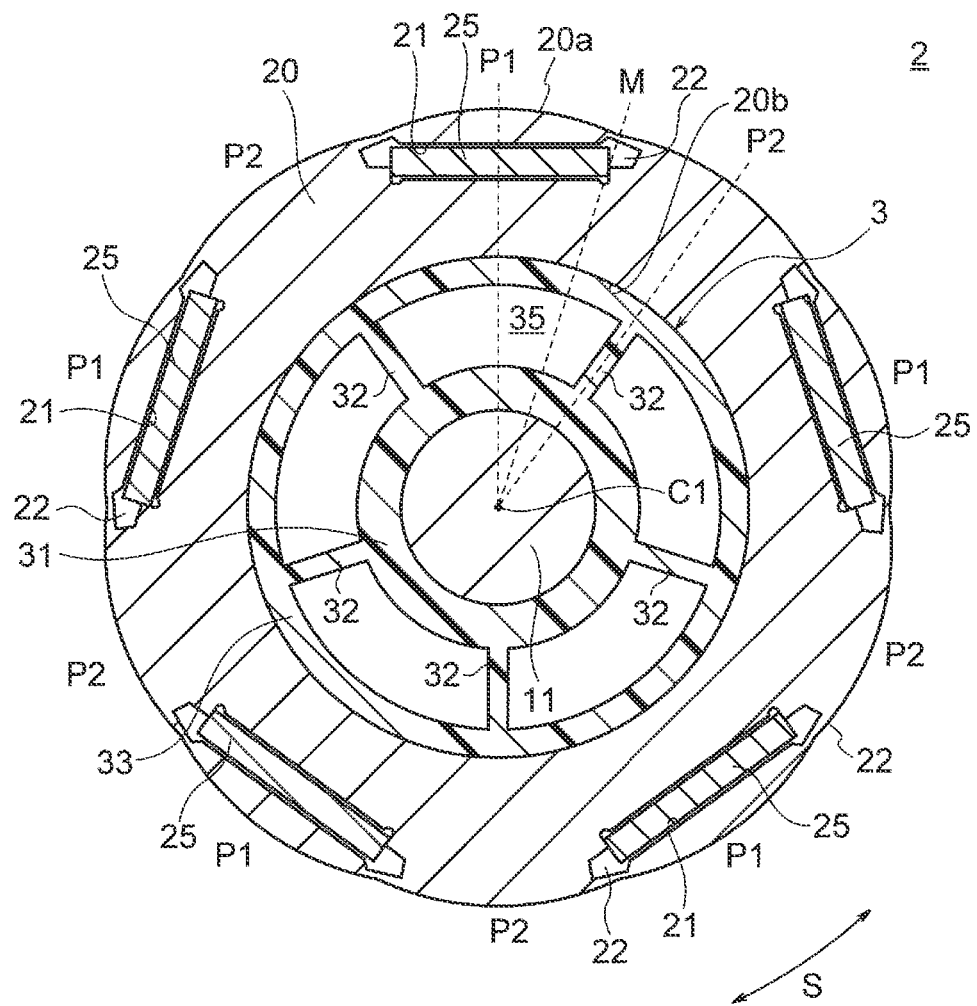
FIG. 4 is a transverse sectional view illustrating the rotor in the first embodiment.

FIG. 3 is a longitudinal sectional view illustrating the rotor 2. FIG. 4 is a longitudinal sectional view illustrating a part of the rotor 2 in an enlarged manner. FIG. 4 is a transverse sectional view illustrating the rotor 2 taken along line IV-IV in FIG. 3.

As illustrated in FIG. 4, the rotor 2 includes the shaft 11 as a rotation shaft, a rotor core 20 provided on an outer side of and at a distance from the shaft 11 in the radial direction, the plurality of magnets 25 embedded in the rotor core 20, and a resin portion 3 disposed between the shaft 11 and the rotor core 20. The number of magnets 25 is five in this example. The magnets 25 are also referred to as main magnets or rotor magnets.

The rotor core 20 is a member having an annular shape about the axis C1. The rotor core 20 has an outer circumference 20a and an inner circumference 20b, and the inner circumference 20b faces the shaft 11 at a distance from the shaft 11. The rotor core 20 is formed by stacking a plurality of stacking elements in the axial direction and integrally fixing the stacking elements by crimping, welding, bonding or the like. The stacking elements are, for example, electromagnetic steel sheets, and each of the electromagnetic steel sheets has a thickness of 0.1 mm to 0.7 mm.

The rotor core 20 has a plurality of magnet insertion holes 21 in the circumferential direction. The magnet insertion holes are disposed at equal intervals in the circumferential direction, and disposed at the same distance from the axis C1. The number of magnet insertion holes 21 is five in this example. The magnet insertion holes 21 are formed along the outer circumference 20a of the rotor core 20, and pass through the rotor core 20 in the axial direction.

The magnets 25 are inserted in the magnet insertion holes 21. Each of the magnets 25 is in the form of a flat plate, and has a rectangular shape in a cross section perpendicular to the axial direction. Each magnet 25 is a rare earth magnet, and more specifically neodymium sintered magnet containing neodymium (Nd), iron (Fe), and boron (B) as main components. Flux barriers 22 which are openings are formed at both ends of each of the magnet insertion holes 21 in the circumferential direction. The flux barriers 22 suppress short circuit of magnetic fluxes between adjacent ones of the magnets 25.

The five magnets 25 are disposed so that the magnetic poles of the same polarity face the outer circumferential side of the rotor core 20. In the rotor core 20, in a region between two of the magnets 25 adjacent to each other in the circumferential direction, a magnetic pole whose polarity is opposite to those of the magnets 25 is formed.

Thus, in the rotor 2, five first magnetic poles P1 and five second magnetic poles P2 are alternately arranged in the circumferential direction. The first magnetic poles P1 are formed by the magnets 25, and the second magnetic poles P2 are formed by the rotor core 20. Such a configuration is referred to as a consequent pole type.

In the following description, when the term "magnetic pole" is simply used, this refers to either of the first magnetic pole P1 and the second magnetic pole P2. The number of magnetic poles of the rotor 2 is 10. The magnetic poles P1 and P2 of the rotor 2 are arranged at equal angular intervals in the circumferential direction with a pole pitch of 36 degrees (360 degrees/10). A portion between the first magnetic pole P1 and the second magnetic pole P2 is an inter-pole portion M.

The outer circumference 20a of the rotor core 20 has a so-called flower shape in a cross section perpendicular to the axial direction. In other words, the outer circumference 20a of the rotor core 20 has a shape such that the outer diameter of the rotor core 20 is maximum at the pole center of each of the magnetic poles P1 and P2 and is minimum at each inter-pole portion M, and an arc shape is formed between each pole center and its adjacent inter-pole portion M. The shape of the outer circumference 20a of the rotor core 20 is not limited to the flower shape, but may be a circular shape. The inner circumference 20b of the rotor core 20 has a circular shape in a cross section perpendicular to the axial direction.

In the consequent pole type rotor 2, the number of magnets 25 can be reduced to a half of the number of magnets in a non-consequent pole type rotor having the same number of magnetic poles. Since the number of expensive magnets 25 is small, the manufacturing cost of the rotor 2 is reduced.

The number of magnetic poles of the rotor 2 is 10 in this example, but only needs to be four or more. In this example, one magnet 25 is disposed in one magnet insertion hole 21, but two or more magnets 25 may be disposed in one magnet insertion hole 21.

The resin portion 3 is provided between the shaft 11 and the rotor core 20. The resin portion 3 holds the shaft 11 and the rotor core 20 in the state where the shaft 11 and the rotor core 20 are apart from each other. The resin portion 3 is formed of a non-magnetic material. The resin portion 3 is preferably formed of a thermoplastic resin such as PBT.

The resin portion 3 includes an inner annular portion 31 having an annular shape and provided in contact with the outer circumference of the shaft 11, an outer annular portion 33 having an annular shape and provided in contact with the inner circumference 20b of the rotor core 20, and a plurality of ribs 32 connecting the inner annular portion 31 and the outer annular portion 33 to each other. The ribs 32 are arranged at equal intervals in the circumferential direction about the axis C1. The number of ribs 32 is, for example, a half of the number of magnetic poles, and is five in this example.

The shaft 11 is fitted inside the inner annular portion 31 of the resin portion 3. The ribs 32 are arranged at equal intervals in the circumferential direction, and radially extend outward in the radial direction from the inner annular portion 31. A hollow portion 35 is formed between each adjacent ones of the ribs 32 in the circumferential direction. In this example, the number of ribs 32 is a half of the number of magnetic poles, and the positions of the ribs 32 in the circumferential direction coincide with the positions of the pole centers of the second magnetic poles P2. However, the number and arrangement of the ribs 32 are not limited to examples described here.

As illustrated in FIG. 3, a sensor magnet 26 is disposed to face the rotor core 20 in the axial direction. The sensor magnet 26 is held by the resin portion 3. The sensor magnet 26 has the same number of magnetic poles as the number of magnetic poles of the rotor 2. A magnetic field of the sensor magnet 26 is detected by the magnetic sensor mounted on the wiring board 6 so that a position of the rotor 2 in the circumferential direction, that is, a rotating position of the rotor 2, is detected.

(Configuration of Cover Portion 40 of Mold Stator 50)

As illustrated in FIG. 1, the cover portion 40 includes a core-surrounding portion 41 surrounding the stator core 51 from the outer side in the radial direction, and core-adjacent portions 42 and 43 projecting on both sides of the stator core 51 in the axial direction. The core-surrounding portion 41 includes the attachment legs 55 described above.

The core-adjacent portion 42 is located on the load side of the core-surrounding portion 41, that is, on the left side of the core-surrounding portion 41 in FIG. 1. The core-adjacent portion 42 is a portion covering the insulating portion 52 and the coils 53 projecting from an end face of the stator core 51 in the axial direction. The core-adjacent portion 42 has the opening 57 described above.

The core-adjacent portion 43 is located on the counter-load side of the core-surrounding portion 41, that is, on the right side of the core-surrounding portion 41 in FIG. 1. The core-adjacent portion 43 is a portion covering the insulating portion 52 and the coils 53 projecting from an end face of the stator core 51 in the axial direction and also covering the wiring board 6. The core-adjacent portion 43 has the bearing support portion 58 described above.

A minimum distance in the radial direction from the axis C1 to an outer circumference of the core-surrounding portion 41 is represented by R1. The outer circumference of the core-surrounding portion 41 has a cylindrical shape in this example, but may have a tapered shape. A minimum distance in the radial direction from the axis C1 to an outer circumference of the stator core 51 is represented by R2. R1 and R2 satisfy $R1 \geq 1.15 \times R2$.

A minimum thickness of the core-surrounding portion 41 in the radial direction is represented by T1. The minimum thickness T1 is a minimum distance in the radial direction between the outer circumference of the core-surrounding portion 41 and the outer circumference of the stator core 51. The thickness of the core-surrounding portion 41 in the radial direction is uniform in the axial direction except for the attachment legs 55 in this example, but may vary in the axial direction.

A minimum thickness of the core-adjacent portions 42 and 43 in the radial direction is represented by T2. The minimum thickness of the core-adjacent portion 42 is a minimum distance in the radial direction between the outer circumference of the core-adjacent portion 42 and components covered with the core-adjacent portion 42. In this example, the outer circumference of the core-adjacent portion 42 is tapered, and the outer diameter of the core-adjacent portion 42 decreases as the distance from the core-surrounding portion 41 in the axial direction increases. Thus, the minimum thickness T2 of the core-adjacent portion 42 is a distance in the radial direction between the outer circumference of the core-adjacent portion 42 and a projecting end of the insulating portion 52.

The minimum thickness of the core-adjacent portion 43 is a minimum distance in the radial direction between the outer circumference of the core-adjacent portion 43 and components covered with the core-adjacent portion 43. The outer diameter of the core-adjacent portion 43 is larger than the outer diameter of the core-adjacent portion 42. Thus, the minimum thickness T2 of the whole of the core-adjacent portions 42 and 43 is the above described distance in the radial direction between the outer circumference of the core-adjacent portion 42 and the projecting end of the insulating portion 52.

Figure 5:
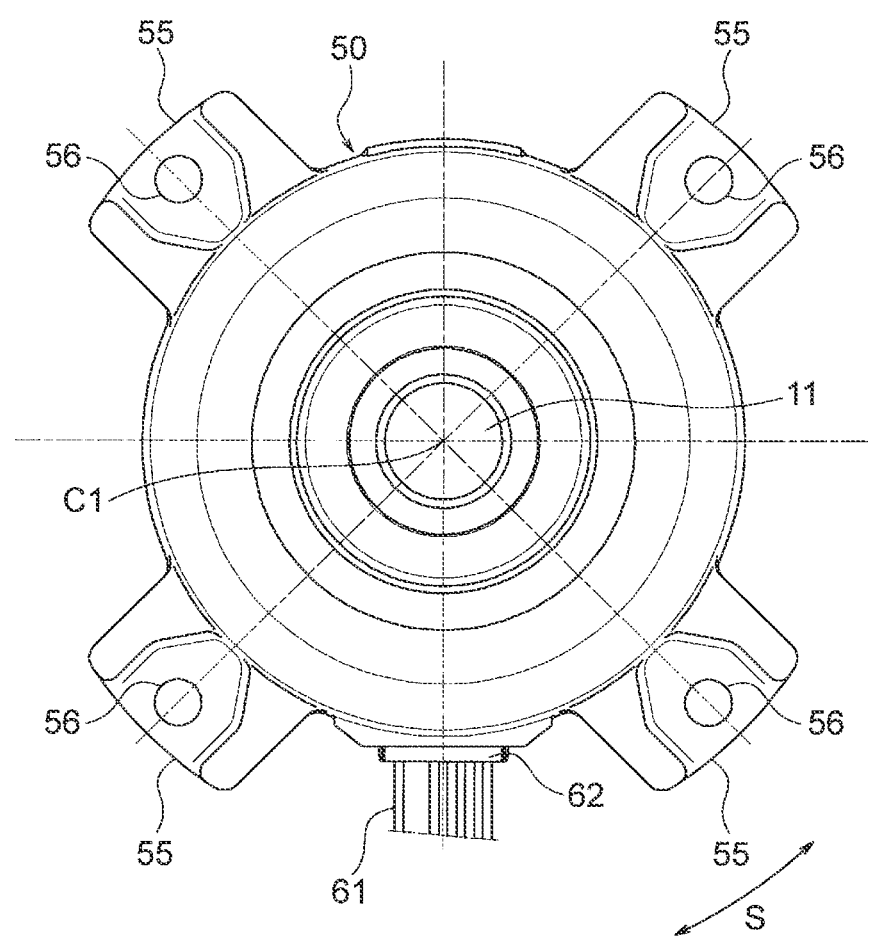
FIG. 5 is a rear view illustrating the motor in the first embodiment.
Figure 6:
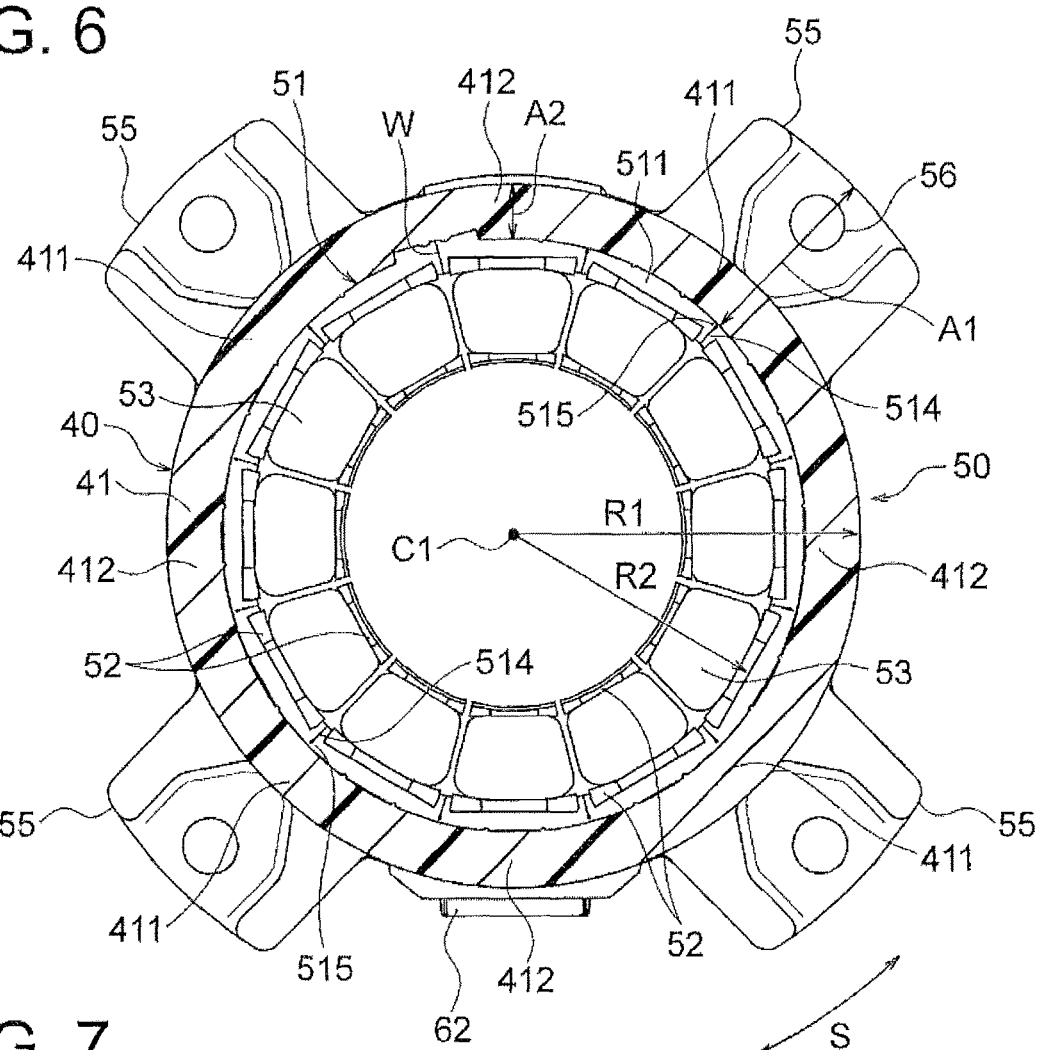
FIG. 6 is a partially transverse sectional view illustrating a mold stator in the first embodiment.

FIG. 5 is a view of the motor 1 as seen in a direction indicated by arrow V in FIG. 1, that is, a rear view of the motor 1. FIG. 6 is a partially transverse sectional view illustrating the mold stator 50 in a plane indicated by line VI-VI in FIG. 1. In FIG. 6, the cover portion 40 of the mold stator 50 is illustrated in a cross section.

As illustrated in FIG. 5, the mold stator 50 has an outer circumference having an annular shape about the axis. The attachment legs 55 are foamed to project outward in the radial direction from the outer circumference of the mold stator 50. In this example, four attachment legs 55 are formed at intervals of 90 degrees in the circumferential direction. Meanwhile, the number of attachment legs 55 may be any number. Each of the attachment legs 55 has a hole 56 through which a jig for attaching the motor 1 to the air conditioner is inserted.

As illustrated in FIG. 6, the core-surrounding portion 41 of the cover portion 40 is annularly provided to surround the stator core 51 from the outer side in the radial direction, and has the attachment legs 55 described above. The core-surrounding portion 41 has first portions 411 each of which is located on the outer side of the thin-wall connecting portion 515 of the stator core 51 in the radial direction, and second portions 412 each of which is located on the outer side of the tooth 512 of the stator core 51 in the radial direction.

The first portions 411 and the second portions 412 are alternately arranged in the circumferential direction. The number of first portions 411 and the number of second portions 412 are both equal to the number of teeth 512, and are 12 in this example. The attachment legs 55 are formed on the outer sides of four of the twelve first portions 411 in the radial direction.

The first portion 411 only needs to be located on the outer side of the thin-wall connecting portion 515 in the radial direction, and may have any width in the circumferential direction. Similarly, the second portion 412 only needs to be located on the outer side of the tooth 512 in the radial direction, and may have any width in the circumferential direction.

In the core-surrounding portion 41, a maximum thickness of the first portion 411 in the radial direction is represented by A1. The maximum thickness A1 of the first portion 411 is a maximum distance from the outer circumference of the stator core 51 to the outer circumference of the first portion 411. In this example, the maximum thickness A1 of the first portion 411 is a distance from the outer circumference of the stator core 51 to the outer circumference of the attachment leg 55.

A maximum thickness of the second portion 412 in the radial direction is represented by A2. The maximum thickness A2 of the second portion 412 is a maximum distance from the outer circumference of the stator core 51 to the outer circumference of the second portion 412. The maximum thickness A1 of the first portion 411 is thicker than the maximum thickness A2 of the second portion 412.

The minimum distance R1 from the axis C1 to the outer circumference of the core-surrounding portion 41, the minimum distance R2 from the axis C1 to the outer circumference of the stator core 51, and the maximum thickness A1 of the first portion 411 satisfy R2+A1≥R1. That is, the first portions 411 including the attachment legs 55 project outward in the radial direction relative to the other portions of the core-surrounding portion 41.

Figure 7:
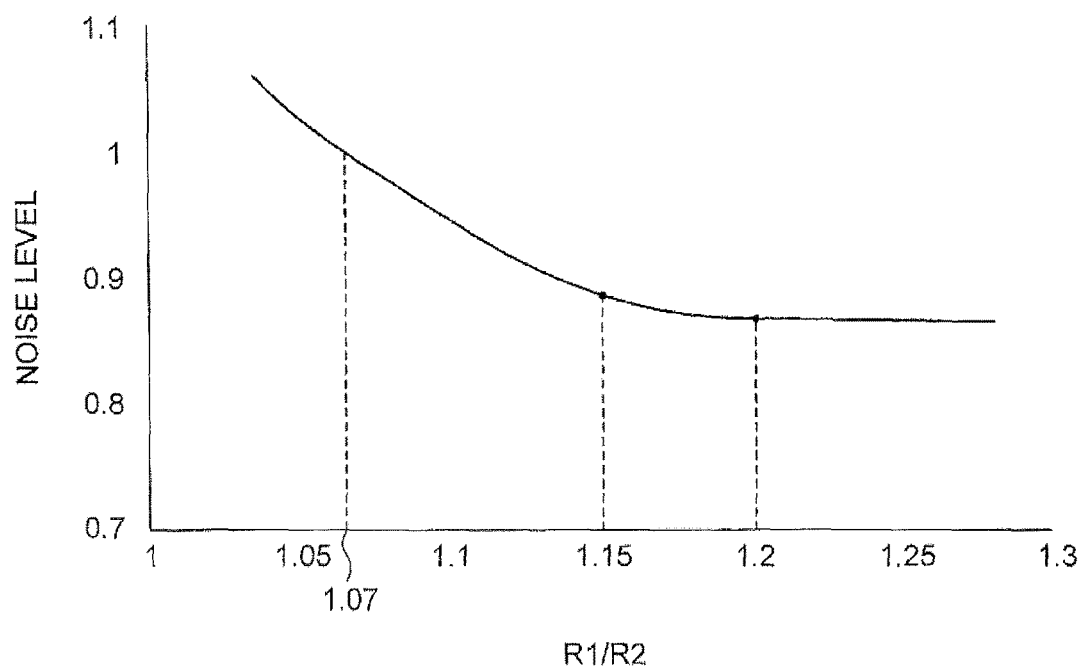
FIG. 7 is a graph illustrating a relationship between R1/R2 and a noise level in the first embodiment.

FIG. 7 is a graph illustrating a relationship between a noise level and a ratio R1/R2 of the minimum distance R1 from the axis C1 to the outer circumference of the core-surrounding portion 41 to the minimum distance R2 from the axis C1 to the outer circumference of the stator core 51. The noise level is represented as a relative value with respect to a reference value that is a noise level in the case where R1/R2 is 1.07.

As shown in FIG. 7, as R1/R2 increases, the noise level decreases. This is because the cover portion 40 can firmly hold the stator core 51 as the outer diameter of the cover portion 40 increases relative to the outer diameter of the stator core 51.

When R1/R2 is 1.15 or more, the degree of decrease in the noise level becomes gradual. That is, a point at which R1/R2 is 1.15 corresponds to an inflexion point of the curve. When R1/R2 exceeds 1.20, the noise level is constant. Accordingly, it is understood that R1/R2 is preferably 1.15 or higher in order to suppress noise sufficiently.

The stator core 51 has a configuration in which the plurality of core segments 51A are connected to one another via the thin-wall connecting portions 515, and thus has lower strength than that of an integrated-type stator core. When the minimum distance R1 from the axis C1 to the outer circumference of the core-surrounding portion 41 and the minimum distance R2 from the axis C1 to the outer circumference of the stator core 51 satisfy R1≥1.15×R2, the cover portion 40 can firmly hold the stator core 51. Accordingly, deformation of the stator core 51 can be suppressed, and vibration and noise of the motor 1 can be reduced.

When the minimum distance R1 from the axis C1 to the outer circumference of the core-surrounding portion 41 and the minimum distance R2 from the axis C1 to the outer circumference of the stator core 51 satisfy R1≥1.20×R2, vibration and noise of the motor 1 can be further reduced.

As described above, in the core-surrounding portion 41, the maximum thickness A1 of the first portions 411 is thicker than the maximum thickness A2 of the second portions 412. In the stator core 51, the thin-wall connecting portions 515 are portions having lower strength. By increasing the maximum thickness A1 of the first portions 411 located on the outer sides of the thin-wall connecting portions 515 in the radial direction, deformation of the stator core 51 can be suppressed, and vibration and noise of the motor 1 can be reduced.

When all the first portions 411 of the core-surrounding portion 41 have the maximum thickness A1, the effect of reducing vibration and noise of the motor 1 can be further enhanced. In this regard, when at least one of the first portions 411 has the maximum thickness A1, vibration and noise of the motor 1 can be reduced to some degree.

As described above, the minimum distance R1 from the axis C1 to the outer circumference of the core-surrounding portion 41, the minimum distance R2 from the axis C1 to the outer circumference of the stator core 51, and the maximum thickness A1 of the first portions 411 of the cover portion 40 satisfy R2+A1≥R1. That is, the first portions 411 project outward in the radial direction relative to the other portions of the core-surrounding portion 41. Thus, as compared to a case where the core-surrounding portion 41 is enlarged as a whole in the radial direction, the use amount of material can be reduced while suppressing deformation of the stator core 51 and reducing vibration and noise of the motor 1.

As described above, since the minimum thickness T1 of the core-surrounding portion 41 is thicker than the minimum thickness T2 of the core-adjacent portions 42 and 43, the use amount of the material forming the cover portion 40 can be reduced while suppressing deformation of the stator core 51 by the core-surrounding portion 41.

(Manufacturing Method of Motor 1)

Figure 8:
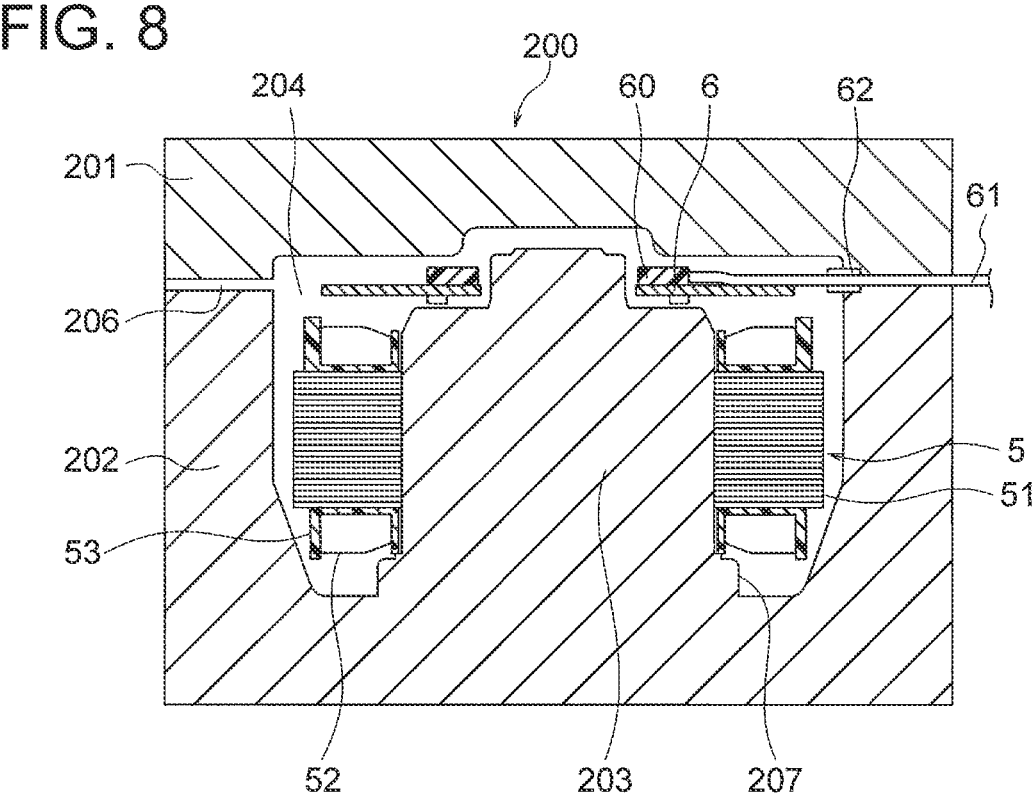
FIG. 8 is a longitudinal sectional view illustrating a mold used in a manufacturing process of the motor in the first embodiment.

Next, a manufacturing method of the motor 1 will be described. First, a mold 200 used in a manufacturing process of the stator 5 will be described. FIG. 8 is a schematic view illustrating the mold 200 used in a molding process.

The mold 200 includes an upper mold 201 and a lower mold 202 capable of being opened and closed, and a cavity 204 which is a hollow portion is formed between the upper mold 201 and the lower mold 202. A runner 206 that is a channel through which a resin is injected into the cavity 204 is formed between the upper mold 201 and the lower mold 202. The runner 206 leads to an upper end portion of the cavity 204.

In the lower mold 202, a columnar center core 203 is formed to protrude in the cavity 204. The center core 203 is engaged with the inner side of the stator 5. A larger-diameter portion 207 protruding outward in the radial direction from the center core 203 is formed at a lower end of the center core 203. The larger-diameter portion 207 is a portion corresponding to the opening 57 (FIG. 1) of the stator 5.

Figure 9:
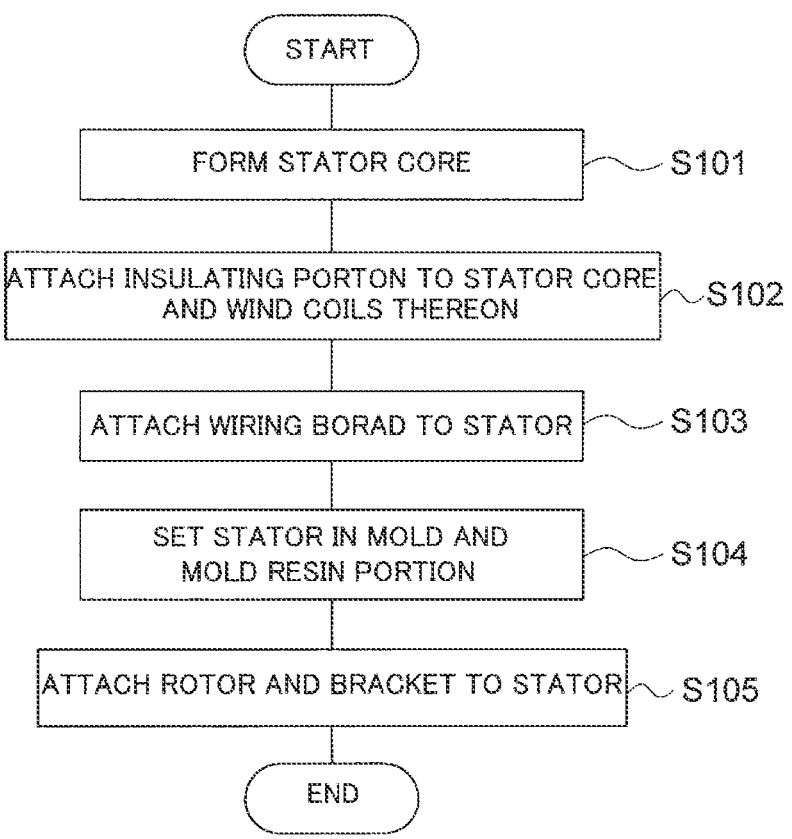
FIG. 9 is a flowchart illustrating the manufacturing process of the motor in the first embodiment.

FIG. 9 is a flowchart illustrating the manufacturing process of the motor 1. First, stacking elements are stacked and integrally fixed by crimping or the like to thereby form the stator core 51 (step S101). In this stage, the core segments 51A of the stator core 51 are not bent in an annular shape, and are extended in a band shape.

Then, a molded body of a thermoplastic resin is attached to the stator core 51 or the thermoplastic resin is molded integrally with the stator core 51 to thereby foam the insulating portion 52. Thereafter, the coils 53 are wound around the teeth 512 of the stator core 51 via the insulating portion 52. Then, the core segments 51A of the stator core 51 are bent in an annular shape, and the end portions W of the stator core 51 are welded together (step S102).

Then, the wiring board 6 is attached to the insulating portion 52 on the stator core 51, and the motor 1 and the wiring board 6 are electrically connected to each other (step S103). In this manner, the stator 5 including the stator core 51, the insulating portion 52, the coil 53, and the wiring board 6 is manufactured.

Then, the stator 5 is set in the mold 200 illustrated in FIG. 8, and the cover portion 40 is formed by molding with a resin (step S104). Specifically, the upper mold 201 is moved upward to open the cavity 204, and the stator 5 is set in the cavity 204. The lead-out portion 62 of the stator 5 projects to the outside of the cavity 204.

Thereafter, the upper mold 201 is moved downward to close the cavity 204, and a resin such as BMC is injected into the cavity 204 through the runner 206 and is cured. In the case where a thermosetting resin is used, after the resin is injected into the cavity 204, the mold 200 is heated to thereby cure the resin.

The resin cured in the cavity 204 foams the cover portion 40 covering the stator 5. In this manner, the mold stator 50 is formed. The resin is not limited to the thermosetting resin, and may be, for example, a thermoplastic resin.

On the other hand, the rotor 2 is manufactured in the following manner. First, stacking elements are stacked and integrally fixed by crimping or the like to thereby form the rotor core 20, and the magnets 25 are inserted in the magnet insertion holes 21 of the rotor core 20. Further, the rotor core 20 is set in a mold for a rotor together with the shaft 11 and the sensor magnet 26, and a resin is injected into the mold and cured to thereby form the resin portion 3. In this manner, the rotor 2 (FIG. 3) is manufactured.

Subsequently, the bearings 12 and 13 are attached to the shaft 11 of the rotor 2, and the rotor 2 is inserted inside the mold stator 50 through the opening 57. The bracket 15 and the waterproof cap 14 are attached to the opening 57 of the mold stator 50 (step S105). In this manner, manufacturing of the motor 1 is completed.

Advantages of Embodiment

As described above, the motor 1 according to the first embodiment includes the annular stator core 51 in which the plurality of core segments 51A are connected in the circumferential direction, and the cover portion 40 including the core-surrounding portion 41 surrounding the stator core 51 from the outer side in the radial direction. The rotor 2 includes the rotor core 20 provided on the inner side of the stator core 51 in the radial direction and the magnets 25 attached to the rotor core 20. The magnets 25 constitute the first magnetic poles P1, and parts of the rotor core 20 constitute the second magnetic poles P2. The minimum distance R1 from the axis C1 to the outer circumference of the core-surrounding portion 41 in the radial direction and the minimum distance R2 from the axis C1 to the outer circumference of the stator core 51 in the radial direction satisfy $R1 \geq 1.15 \times R2$. Thus, the stator core 51 can be firmly held by the cover portion 40. Accordingly, deformation of the stator core 51 can be suppressed, and vibration and noise of the motor 1 can be reduced.

Further, the minimum thickness T1 of the core-surrounding portion 41 surrounding the stator core 51 is thicker than the minimum thickness T2 of the core-adjacent portions 42 and 43 projecting from the stator core 51 in the axial direction. Thus, deformation of the stator core 51 can be suppressed and vibration and noise of the motor 1 can be reduced, while reducing the use amount of the material forming the cover portion 40.

In the cover portion 40, the maximum thickness A1 in the radial direction of the first portion 411 of the stator core 51 located on the outer side of the thin-wall connecting portion 515 in the radial direction and the minimum distances R1 and R2 described above satisfy $R2+A1>R1$. Thus, the effect of suppressing deformation of the stator core 51 and the effect of reducing vibration and noise of the motor 1 can be enhanced while reducing the use amount of the material forming the cover portion 40.

In the cover portion 40, the maximum thickness A1 in the radial direction of the first portion 411 located on the outer side of the thin-wall connecting portion 515 of the stator core 51 in the radial direction and the maximum thickness A2 in the radial direction of the second portion 412 located on the outer side of the tooth 512 in the radial direction satisfy $A1>A2$. Thus, the thin-wall connecting portion 515 of the stator core 51 can be especially firmly held, and the effect of suppressing deformation of the stator core 51 can be enhanced.

In addition, the maximum thickness A2 of the second portion 412 located on the outer side of the tooth 512 in the radial direction is the narrowest in the thickness of the core-surrounding portion 41. Thus, the use amount of the material forming the cover portion 40 is reduced, and the effect of suppressing deformation of the stator core 51 and the effect of vibration and noise of the motor 1 can be enhanced.

Since the cover portion 40 includes the attachment leg 55 on the outer side of the thin-wall connecting portion 515 in the radial direction, the stator core 51 can be firmly held by using the attachment leg 55 for attaching the motor 1 to the air conditioner. Accordingly, the effect of suppressing deformation of the stator core 51 and the effect of reducing vibration and noise of the motor 1 can be enhanced.

Second Embodiment

Figure 10:
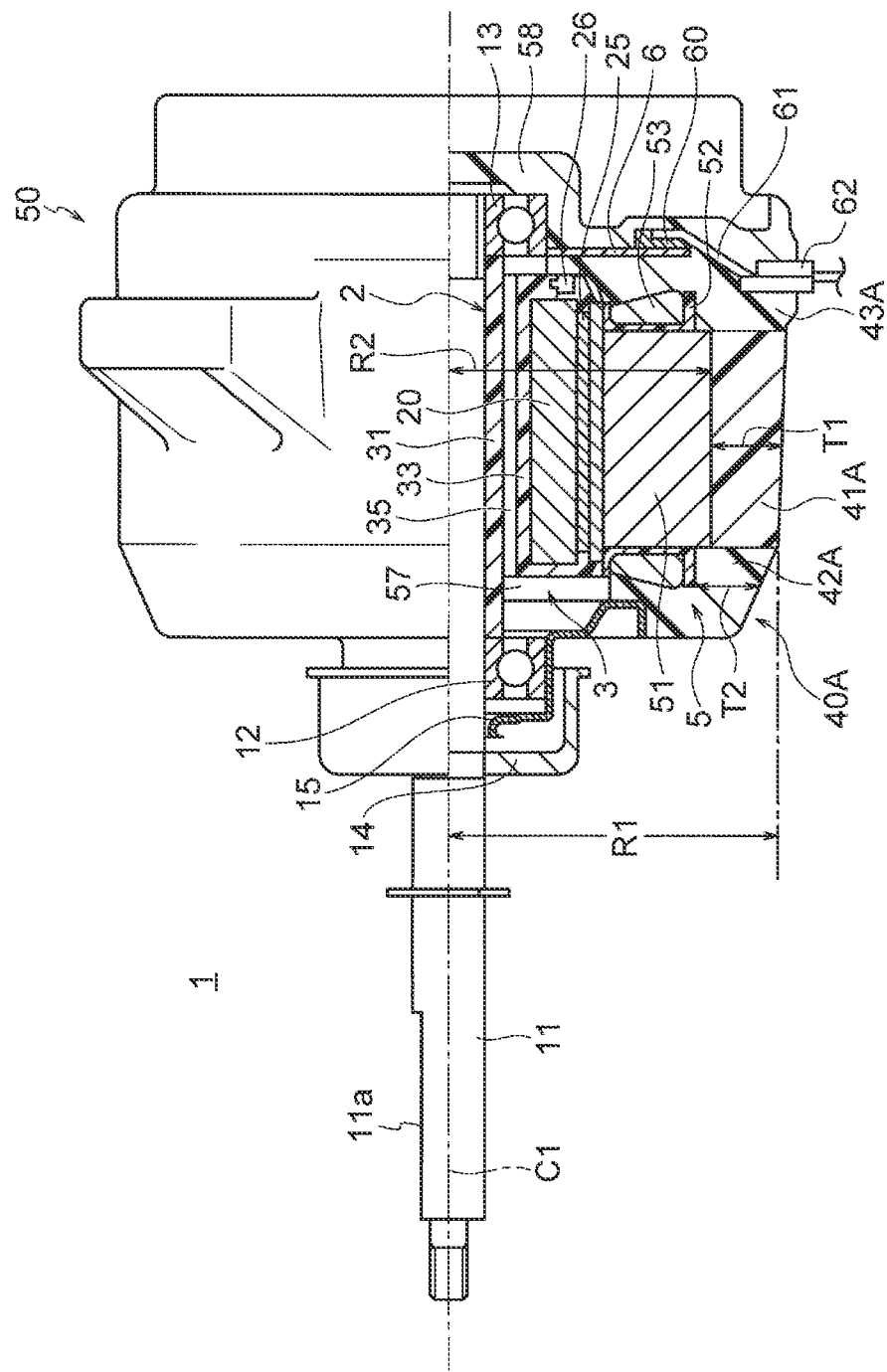
FIG. 10 is a partially longitudinal sectional view illustrating a motor in a second embodiment.

Next, a motor 1 according to a second embodiment will be described. FIG. 10 is a partially longitudinal sectional view of the motor 1 according to the second embodiment. In the motor 1 of the second embodiment, a core-surrounding portion 41A of a cover portion 40A and core-adjacent portions 42A and 43A of a mold stator 50 are formed of materials having different mechanical property. The core-surrounding portion 41A is also referred to as a first constituent portion, and the core-adjacent portions 42A and 43A are also referred to as second constituent portions. The mechanical property is, for example, strength such as tensile strength.

The core-surrounding portion 41A holds the stator core 51, and thus the core-surrounding portion 41A is preferably formed of a material having especially high strength. On the other hand, the core-adjacent portions 42A and 43A cover components having complicated shapes, such as the wiring board 6, the lead-out portion 62, and the insulating portion 52, and thus each of the core-adjacent portions 42A and 43A is preferably formed of a material that exhibits high flowability in molding.

Each of the core-surrounding portion 41A and the core-adjacent portions 42A and 43A may be formed of, for example, a thermosetting resin such as BMC. For example, BMC contains 20 weight % of unsaturated polyester, 70 weight % of a filler such as calcium carbonate or calcium hydroxide, 5 to 7 weight % of a cross-linking agent such as styrene monomer, and 2 to 3 weight % of an additive agent such as a release agent or a coloring agent.

In the second embodiment, the core-surrounding portion 41A of the cover portion 40A is foamed of a material obtained by adding a reinforcing material such as glass fibers to the BMC described above. The adding amount of the reinforcing material is, for example, 5 weight %. On the other hand, the core-adjacent portions 42A and 43A are formed of BMC to which no reinforcing material is added. Accordingly, the stator core 51 can be firmly held by the core-surrounding portion 41A, and components such as the wiring board 6 can be covered with the core-adjacent portions 42A and 43A without gaps. That is, vibration and noise of the motor 1 can be suppressed, and quality of the motor 1 can be enhanced.

Each of the core-surrounding portion 41A and the core-adjacent portions 42A and 43A may be formed of a thermoplastic resin such as polybutylene terephthalate (PBT) or polyphenylene sulfide (PPS). In general, PPS has higher strength than that of PBT, and thus the core-surrounding portion 41A may be formed of PPS and the core-adjacent portions 42A and 43A may be foamed of PBT.

The core-surrounding portion 41A may be formed of a material obtained by adding a reinforcing material such as glass fibers to a thermoplastic resin. The adding amount of the reinforcing material is, for example, 15 to 50 weight %.

In this case, the core-adjacent portions 42A and 43A can be formed of a thermoplastic resin to which no reinforcing material is added.

At least one of the core-surrounding portion 41A or the core-adjacent portions 42A and 43A may be foamed of a material other than a resin. For example, the core-surrounding portion 41A may be formed of an aluminum die-cast molded body and the core-adjacent portions 42A and 43A may be formed of the thermosetting resin or the thermoplastic resin described above.

Since the core-surrounding portion 41A serves to reinforce the stator 5, the core-surrounding portion 41A may be foamed of a thermoplastic resin to which a reinforcing material such as glass fibers is added. Since the core-adjacent portions 42A and 43A include the bearing support portion 58 and the like, the core-adjacent portions 42A and 43A may be formed of a thermosetting resin with which high dimensional accuracy can be easily obtained. That is, the thermoplastic resin and the thermosetting resin may be used in combination.

Except for the aspects described above, the motor 1 of the second embodiment is configured in a similar manner to the motor 1 of the first embodiment.

Figure 11:
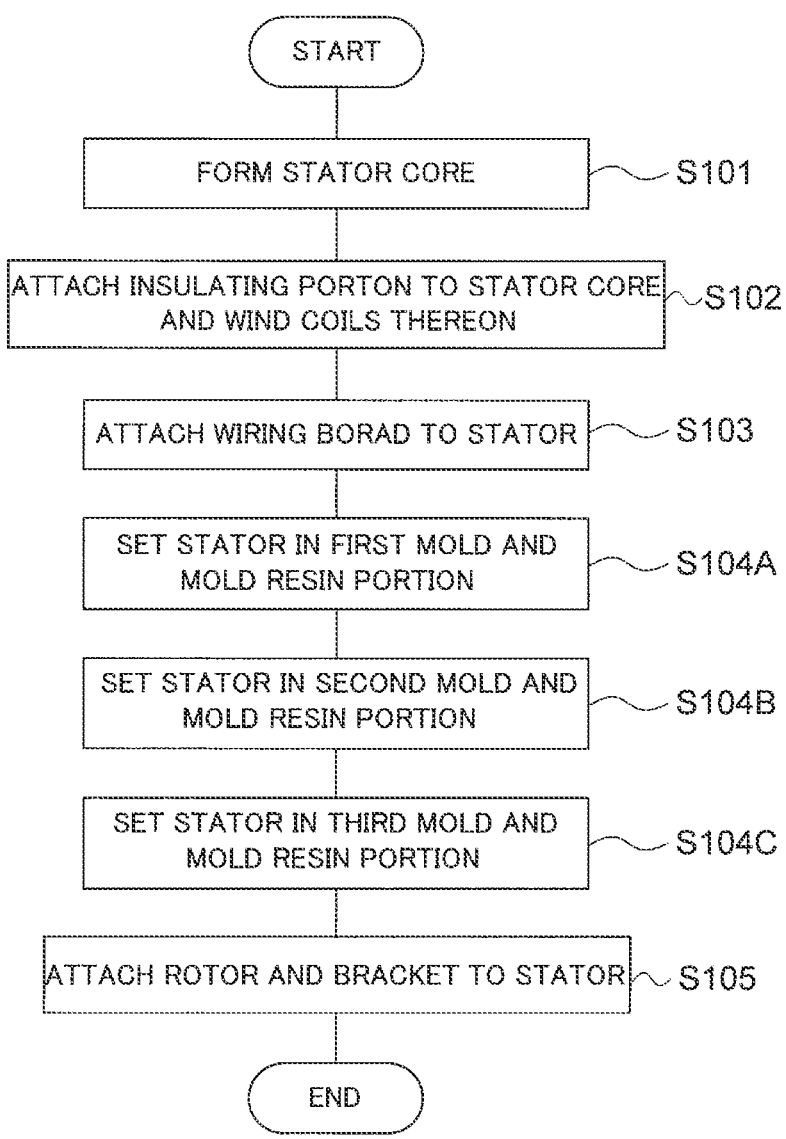
FIG. 11 is a flowchart illustrating a manufacturing process of the motor in the second embodiment.

FIG. 11 is a flowchart illustrating a manufacturing process of the motor 1 according to the second embodiment. Steps of manufacturing the stator 5 (steps S101 to S103) are similar to those in the first embodiment.

In the second embodiment, the core-surrounding portion 41A and the core-adjacent portions 42A and 43A of the cover portion 40A are formed of different materials, and thus the three molding steps are performed. In the first molding step, the stator 5 is set in a first mold having a cavity in a region corresponding to the core-adjacent portion 42A, and then, for example, BMC to which no reinforcing material is added is injected into the mold and heated (step S104A). Accordingly, the core-adjacent portion 42A covering the load side of the stator 5 is formed.

Next, the stator 5 is set in a second mold having a cavity in a region corresponding to the core-surrounding portion 41A, and then, for example, BMC to which a reinforcing material is added is injected into the mold and heated (step S104B). Accordingly, the core-surrounding portion 41A covering the stator core 51 is formed adjacent to the core-adjacent portion 42A.

Next, the stator 5 is set in a third mold having a cavity in a region corresponding to the core-adjacent portion 43A, and then, for example, BMC to which no reinforcing material is added is injected into the mold and heated (step S104C). Accordingly, the core-adjacent portion 43A covering the counter-load side of the stator 5 is formed adjacent to the core-surrounding portion 41A.

In this manner, the mold stator 50 is formed. Subsequently, as described in the first embodiment, the rotor 2 is inserted inside the mold stator 50, and the bracket 15 and the waterproof cap 14 are attached to the mold stator 50 (step S105). In this manner, manufacturing of the motor 1 is completed.

Description has been made to the manufacturing process in which each of the core-surrounding portion 41A and the core-adjacent portions 42A and 43A is formed of the thermosetting resin. Alternatively, each of the core-surrounding portion 41A and the core-adjacent portions 42A and 43A may be formed of a thermoplastic resin. In this case, in each of the steps S104A to S104C, instead of injecting the resin into the mold and curing the resin by heating, a molten resin melted by heating is injected into the mold and cured by cooling.

In the manufacturing process illustrated by FIG. 11, the core-surrounding portion 41A and the core-adjacent portions 42A and 43A are formed in the three steps of steps S104A to S104C. However, this embodiment is not limited to such a manufacturing process. For example, the core-surrounding portion 41A and the core-adjacent portions 42A and 43A may be formed in two steps by forming the core-surrounding portion 41A in step S104A and then forming the core-adjacent portions 42A and 43A at the same time on both sides of the core-surrounding portion 41A in the axial direction.

As described above, in the second embodiment, the core-surrounding portion 41A and the core-adjacent portions 42A and 43A of the cover portion 40A of the mold stator 50 are foamed of materials having different mechanical property, and thus the stator core 51 can be firmly held by the core-surrounding portion 41A and the wiring board 6 and other components can be covered with the core-adjacent portions 42A and 43A without gaps. Accordingly, vibration and noise of the motor 1 can be reduced, and performance of the motor 1 can be further enhanced.

In addition, since each of the core-surrounding portion 41A and the core-adjacent portions 42A and 43A is foamed of a material containing a resin, the core-surrounding portion 41A and the core-adjacent portions 42A and 43A having different mechanical property can be manufactured with a relatively simple process.

In particular, at least one of the core-surrounding portion 41A or the core-adjacent portions 42A and 43A is formed of a material including a thermosetting resin or a material including a thermoplastic resin. Thus, the molding process using a plurality of molds can be performed as described above, and the manufacturing process can be further simplified.

Third Embodiment

Figure 12:
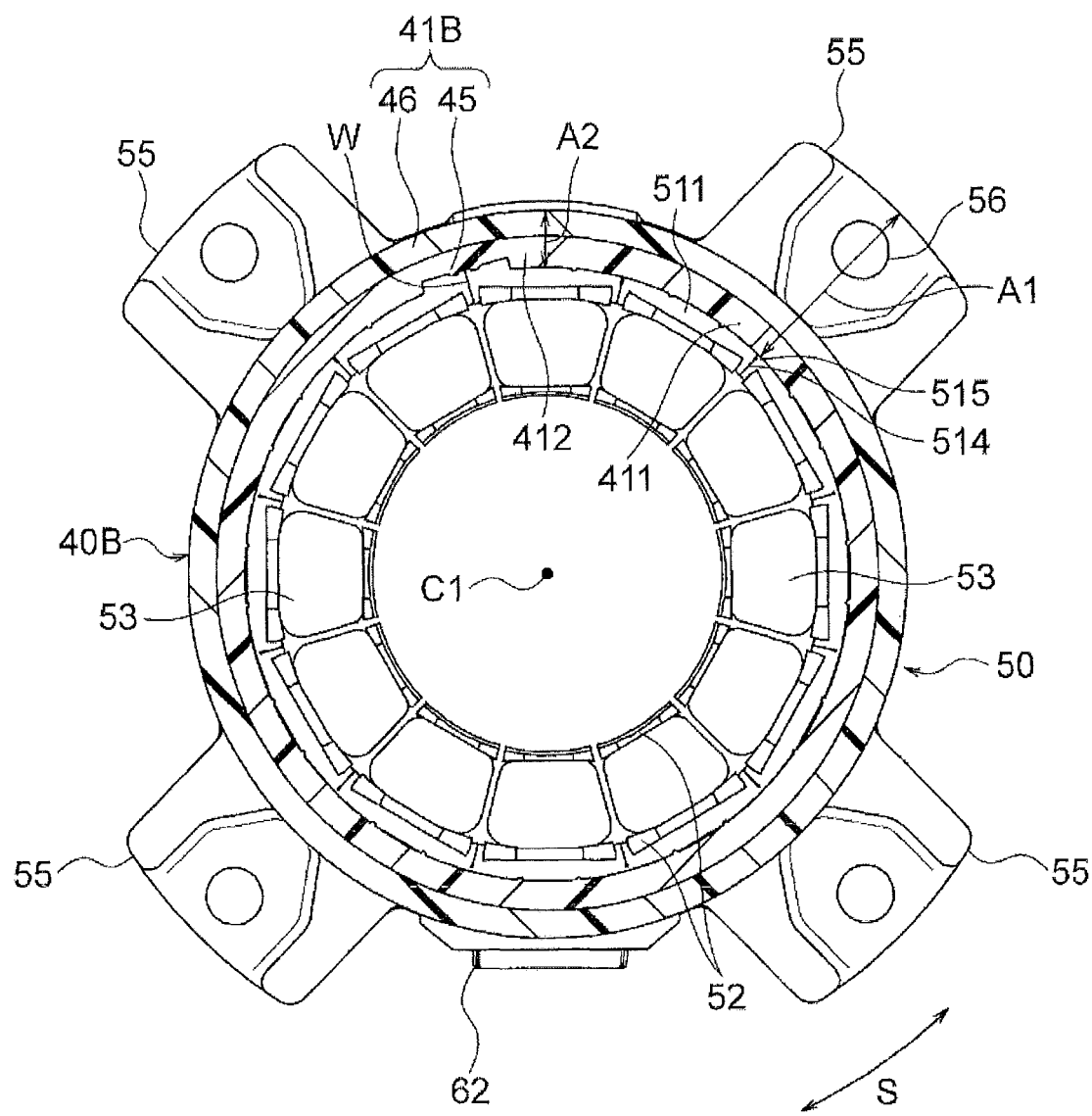
FIG. 12 is a partially transverse sectional view illustrating a mold stator of the motor in the second embodiment.

Next, a motor 1 according to a third embodiment will be described. FIG. 12 is a partially transverse sectional view illustrating a mold stator 50 of the motor 1 according to the third embodiment. A core-surrounding portion 41B of a cover portion 40B according to the third embodiment includes a first constituting portion 45 having an annular shape and surrounding a stator core 51 from an outer side in the radial direction, and a second constituting portion 46 having an annular shape and surrounding the first constituting portion 45 from an outer side in the radial direction. The first constituent portion 45 and the second constituent portion 46 are formed of materials having different mechanical property. The mechanical property is, for example, strength such as tensile strength.

The first constituent portion 45 holds the stator core 51, and thus the first constituent portion 45 is preferably formed of a material having especially high strength. On the other hand, the second constituent portion 46 is provided on the outer side of the first constituent portion 45 in the radial direction, and thus the required strength for the second constituent portion 46 is lower than that for the first constituent portion 45. Thus, the second constituent portion 46 is preferably foamed of a low-cost material.

Each of the first constituent portion 45 and the second constituent portion 46 can be foamed of a thermosetting resin such as BMC. That is, as is the case with the core-surrounding portion 41A of the second embodiment, the first constituent portion 45 may be formed of a material obtained by adding a reinforcing material such as glass fibers to a thermosetting resin. As is the case with the core-adjacent portions 42A and 43A of the second embodiment, the second constituent portion 46 may be foamed of a thermosetting resin to which no reinforcing material is added.

Each of the first constituent portion 45 and the second constituent portion 46 may be foamed of a thermoplastic resin such as PBT or PPS. Specifically, the first constituent portion 45 may be formed of a material obtained by adding a reinforcing material to a thermoplastic resin, and the second constituent portion 46 may be formed of a thermoplastic resin to which no reinforcing material is added.

At least one of the first constituent portion 45 or the second constituent portion 46 may be formed of a material other than a resin. For example, the first constituent portion 45 may be formed of an aluminum die-cast molded body, and the second constituent portion 46 may be foamed of the thermosetting resin or the thermoplastic resin described above.

Although FIG. 12 illustrates the core-surrounding portion 41B of the cover portion 40B, the core-adjacent portions 42 and 43 (FIG. 1) of the cover portion 40B can be formed in a similar manner to those of the first embodiment or the second embodiment. In terms of facilitating the molding, the core-adjacent portions 42 and 43 of the cover portion 40B are preferably molded integrally with the first constituent portion 45 by using the same material as the first constituent portion 45.

Except for the aspects described above, the motor 1 of the third embodiment is configured in a similar manner to the motor 1 of the first embodiment.

Figure 13:
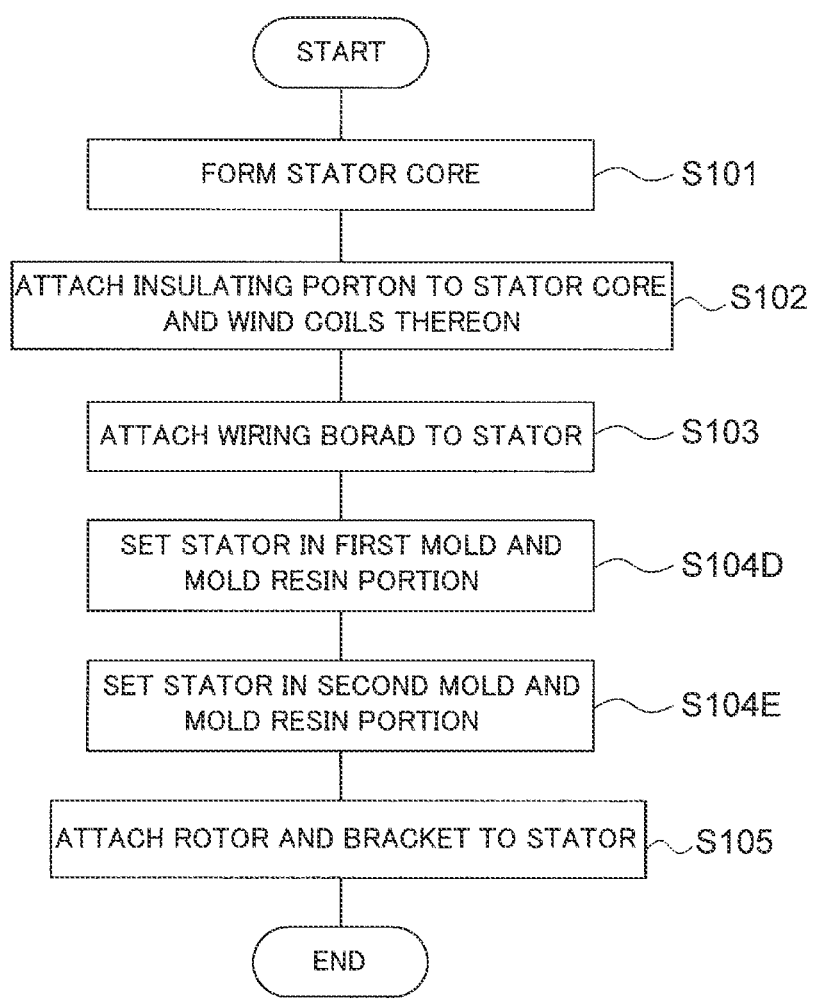
FIG. 13 is a flowchart illustrating the manufacturing process of the motor in the third embodiment.

FIG. 13 is a flowchart illustrating a manufacturing process of the motor 1 according to the third embodiment. Steps of manufacturing the stator 5 (steps S101 to S103) are similar to those in the first embodiment.

In the third embodiment, the first constituent portion 45 and the second constituent portion 46 of the cover portion 40B are formed of different materials, and thus two molding steps are performed. In the first molding step, the stator 5 is set in a first mold having a cavity in a region corresponding to the first constituent portion 45, and then, for example, BMC to which a reinforcing material is added is injected into the mold and heated (step S104D). Accordingly, the first constituent portion 45 covering the stator core 51 and the core-adjacent portions 42 and 43 (FIG. 1) are foamed.

Next, the stator 5 is set in a second mold having a cavity in a region corresponding to the second constituent portion 46, and then, for example, BMC to which no reinforcing material is added is injected into the mold and heated (step S104E). Accordingly, the second constituent portion 46 covering the first constituent portion 45 from the outer side in the radial direction is formed.

In this manner, the mold stator 50 is formed. Subsequently, as described in the first embodiment, the rotor 2 is inserted inside the mold stator 50, and the bracket 15 and the waterproof cap 14 are attached to the mold stator 50 (step S105). In this manner, manufacturing of the motor 1 is completed.

Description has been made to the manufacturing process in which each of the first constituent portion 45 and the second constituent portion 46 is formed of the thermosetting resin. Alternatively, each of the first constituent portion 45 and the second constituent portion 46 may be foamed of a thermoplastic resin. In this case, in each of steps S104D and S104E, instead of injecting the resin in the mold and curing the resin by heating, a molten resin melted by heating is injected into the mold and cured by cooling.

As described above, in the third embodiment, the first constituent portion 45 and the second constituent portion 46 of the cover portion 40B of the mold stator 50 are formed of materials having different mechanical property. Thus, the first constituent portion 45 can firmly hold the stator core 51, and the second constituent portion 46 can be foamed of the low-cost material. Accordingly, vibration and noise of the motor 1 can be reduced, and the manufacturing cost of the motor 1 can be reduced.

In addition, since each of the first constituent portion 45 and the second constituent portion 46 is formed of a material containing a resin, the first constituent portion 45 and the second constituent portion 46 having different mechanical property can be formed by a relatively simple manufacturing method.

In particular, in a case where each of the first constituent portion 45 and the second constituent portion 46 is formed of a material including a thermosetting resin or a material including a thermoplastic resin, molding using the plurality of molds as described above can be performed. Thus, the manufacturing process can be thereby further simplified.

Fourth Embodiment

Figure 14:
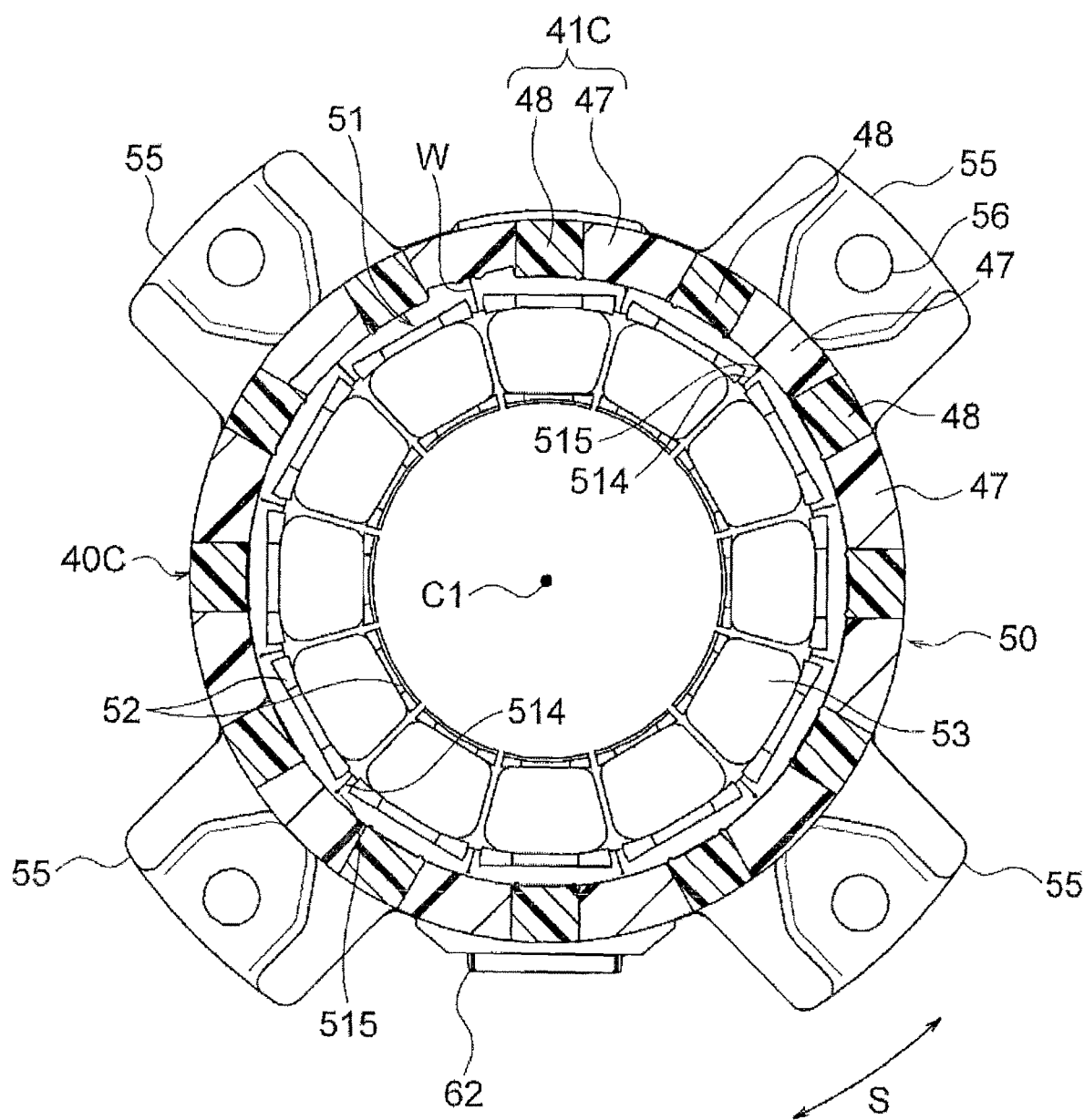
FIG. 14 is a partially transverse sectional view illustrating a mold stator of a motor in a fourth embodiment.

Next, a motor 1 according to a fourth embodiment will be described. FIG. 14 is a partially transverse sectional view illustrating a mold stator 50 of the motor 1 according to the fourth embodiment. A core-surrounding portion 41C of a cover portion 40C according to the fourth embodiment includes first constituent portions 47 each of which is located on an outer side of the thin-wall connecting portion 515 of the stator core 51 in the radial direction, and second constituent portions 48 each of which is located on an outer side of the tooth 512 of the stator core 51 in the radial direction. The first constituent portion 47 and the second constituent portion 48 are formed of materials having different mechanical property. The mechanical property is, for example, strength such as tensile strength.

The first constituent portion 47 holds the thin-wall connecting portion 515 having lower strength in the stator core 51, and thus the first constituent portion 47 is preferably formed of a material having especially high strength. On the other hand, the second constituent portion 48 holds a portion having higher strength in the stator core 51, and thus the required strength for the second constituent portion 48 is lower than that for the first constituent portion 47. Thus, the second constituent portion 48 is preferably formed of a low-cost material.

Each of the first constituent portion 47 and the second constituent portion 48 can be foamed of a thermosetting resin such as BMC. That is, as is the case with the core-surrounding portion 41A of the second embodiment, the first constituent portion 47 may be formed of a material obtained by adding a reinforcing material such as glass fibers to a thermosetting resin. As is the case with the core-adjacent portions 42A and 43A of the second embodiment, the second constituent portion 48 may be foamed of a thermosetting resin to which no reinforcing material is added.

Each of the first constituent portion 47 and the second constituent portion 48 may be foamed of a thermoplastic resin such as PBT or PPS. Specifically, the first constituent portion 47 may be formed of a material obtained by adding a reinforcing material such as glass fibers to a thermoplastic resin. The second constituent portion 48 may be foamed of a thermoplastic resin to which no reinforcing material is added.

At least one of the first constituent portion 47 and the second constituent portion 48 may be formed of a material other than a resin. For example, the first constituent portion 47 may be formed of an aluminum die-cast molded body, and the second constituent portion 48 may be foamed of the thermosetting resin or the thermoplastic resin described above.

Although FIG. 14 illustrates the core-surrounding portion 41C of the cover portion 40C, the core-adjacent portions 42 and 43 (FIG. 1) of the cover portion 40C can be formed in a similar manner to those of the first embodiment or the second embodiment.

Except for the aspects described above, the motor 1 of the fourth embodiment is configured in a similar manner to the motor 1 of the first embodiment.

As described above, in the fourth embodiment, the first constituent portion 47 and the second constituent portion 48 of the cover portion 40C of the mold stator 50 are formed of materials having different mechanical property. Thus, the first constituent portion 47 can firmly hold the stator core 51, and the second constituent portion 48 can be formed of a low-cost material. Accordingly, vibration and noise of the motor 1 can be reduced, and the manufacturing cost of the motor 1 can be reduced.

(Air Conditioner)

Next, an air conditioner to which the motors 1 according to the first through fourth embodiments described above are applicable will be described. FIG. 15(A) is a view illustrating a configuration of an air conditioner 500 to which the motor 1 according to the first embodiment is applied. The air conditioner 500 includes an outdoor unit 501, an indoor unit 502, and a refrigerant pipe 503 connecting the indoor unit 501 and the outdoor unit 502 to each other.

The outdoor unit 501 includes the outdoor fan 510 that is, for example, a propeller fan. The indoor unit 502 includes the indoor fan 520 that is, for example, a crossflow fan. The outdoor fan 510 includes an impeller 505 and a motor 1 for driving the impeller 505. The indoor fan 520 includes an impeller 521 and a motor 1 for driving the impeller 521. Each of these motors 1 has the configuration described in the first embodiment. FIG. 15(A) also illustrates a compressor 504 for compressing refrigerant.

FIG. 15(B) is a sectional view of the outdoor unit 501. The motor 1 is supported by a frame 509 disposed in a housing 508 of the outdoor unit 501. The impeller 505 is attached to the shaft 11 of the motor 1 via a hub 506.

In the outdoor fan 510, the impeller 505 is caused to rotate by rotation of the rotor 2 of the motor 1 and blows air to the outside of a room. Similarly, in the indoor fan 520, the impeller 521 is caused to rotate by rotation of the rotor 2 of the motor 1 and blows air into the room.

In a cooling operation, heat dissipated when refrigerant is condensed by a condenser is released to the outside of the room by air blown by the outdoor fan 510. Further, air deprived of heat in an evaporator is blown into the room by the indoor fan 520.

The motor 1 of the first embodiment described above has the configuration that reduces vibration and noise, and thus quietness of the air conditioner 500 can be enhanced. The motor 1 of the first embodiment may be replaced by any of the motors 1 of the second through fourth embodiments. In this example, the motors 1 are used as a driving source of the outdoor fan 510 and a driving source of the indoor fan 520. However, it is sufficient that the motor 1 is used as a driving source of at least one of the outdoor fan 510 and the indoor fan 520.

The motors 1 described in the first through fourth embodiments may also be mounted on electrical appliances other than a fan of an air conditioner.

Although preferred embodiments of the present invention have been specifically described, the present invention is not limited to the embodiments described above, and various changes and modifications may be made within the gist of the invention.

What is claimed is:

1. A motor comprising:
an annular stator core having a plurality of core segments connected via connecting portions in a circumferential direction about an axis;
a cover portion covering the stator core and having a core-surrounding portion surrounding the stator core from an outer side in a radial direction about the axis and a core-adjacent portion projecting from the stator core in a direction of the axis; and
a rotor having a rotor core provided on an inner side of the stator core in the radial direction and a magnet attached to the rotor core, the magnet forming a first magnetic pole, and a part of the rotor core forming a second magnetic pole,
wherein a minimum distance R1 in the radial direction from the axis to an outer circumference of the core-surrounding portion and a minimum distance R2 in the radial direction from the axis to an outer circumference of the stator core satisfy:

$$R1 \geq 1.15 \times R2,$$

wherein the core-surrounding portion and the core-adjacent portion are formed of materials having different mechanical property,
wherein the core-surrounding portion has a higher strength than the core-adjacent portion, and
wherein a minimum thickness T1 of the core-surrounding portion in the radial direction is thicker than a minimum thickness T2 of the core-adjacent portion in the radial direction.

2. The motor according to claim 1, wherein the core-surrounding portion has a first portion located on an outer side of the connecting portion of the stator core in the radial direction and a second portion adjacent to the first portion in the circumferential direction.

3. The motor according to claim 2, wherein a maximum thickness A1 of the first portion in the radial direction, the minimum distance R1, and the minimum distance R2 satisfy:

$$R2+A1>R1.$$

4. The motor according to claim 2, wherein a maximum thickness A1 of the first portion in the radial direction and a maximum thickness A2 of the second portion in the radial direction satisfy:

$$A1>A2.$$

5. The motor according to claim 2, wherein a maximum thickness A2 of the second portion in the radial direction is thinnest in the core-surrounding portion in the radial direction.

6. The motor according to claim 2, wherein the first portion comprises an attachment leg formed at an outer circumference of the cover portion.

7. The motor according to claim 1, wherein each of the materials having different mechanical property comprises a resin.

8. The motor according to claim 7, wherein at least one of the materials having different mechanical property comprises a thermosetting resin.

9. The motor according to claim 7, wherein at least one of the materials having different mechanical property comprises a thermoplastic resin.

10. The motor according to claim 1, wherein the first constituent portion comprises the core-surrounding portion, and
wherein the second constituent portion comprises the core-adjacent portion projecting from the stator core in a direction of the axis.

11. The motor according to claim 1, wherein the first constituent portion surrounds the stator core from the outer side in the radial direction, and
wherein the second constituent portion surrounds the first constituent portion from an outer side in the radial direction.

12. A fan comprising:
the motor according to claim 1; and
an impeller driven to rotate by the motor.

13. An air conditioner comprising:
an outdoor unit; and
an indoor unit connected to the outdoor unit via a refrigerant pipe,
wherein at least one of the outdoor unit and the indoor unit has the fan according to claim 12.

14. The motor according to claim 1, wherein the minimum distance R1 and the minimum distance R2 satisfy:

$$R1 \geq 1.20 \times R2.$$

15. A motor comprising:
an annular stator core having a plurality of core segments connected via connecting portions in a circumferential direction about an axis;
a cover portion covering the stator core and having a core-surrounding portion surrounding the stator core from an outer side in a radial direction about the axis; and
a rotor having a rotor core provided on an inner side of the stator core in the radial direction and a magnet attached to the rotor core, the magnet forming a first magnetic pole, and a part of the rotor core forming a second magnetic pole,
wherein a minimum distance R1 in the radial direction from the axis to an outer circumference of the core-surrounding portion and a minimum distance R2 in the radial direction from the axis to an outer circumference of the stator core satisfy:

$$R1 \geq 1.15 \times R2,$$

wherein the cover portion has a first constituent portion and a second constituent portion formed of materials having different mechanical property,
wherein the first constituent portion comprises a first portion located on an outer side of the connecting portion in the radial direction, and
wherein the second constituent portion comprises a second portion adjacent to the first portion in the circumferential direction.

16. A manufacturing method of a motor, the manufacturing method comprising the steps of:
forming an annular stator core by connecting a plurality of core segments via connecting portions in a circumferential direction about an axis;
forming a cover portion covering the stator core and having a core-surrounding portion surrounding the stator core from an outer side in a radial direction about the axis and a core-adjacent portion projecting from the stator core in a direction of the axis; and inserting a rotor into an inner side of the stator core in the radial direction, the rotor having a rotor core and a magnet attached to the rotor core, the magnet forming a first magnetic pole, and a part of the rotor core forming a second magnetic pole, wherein, in the forming step of the cover portion, the cover portion is formed so that a minimum distance $R1$ in the radial direction from the axis to an outer circumference of the core-surrounding portion and a minimum distance $R2$ in the radial direction from the axis to an outer circumference of the stator core satisfy $R1 \geq 1.15 \times R2$, wherein the core-surrounding portion and the core-adjacent portion are formed of materials having different mechanical property, wherein the core-surrounding portion has a higher strength than the core-adjacent portion, and wherein a minimum thickness $T1$ of the core-surrounding portion in the radial direction is thicker than a minimum thickness $T2$ of the core-adjacent portion in the radial direction.

17. The manufacturing method of the motor according to claim 16, wherein, in the forming step of the cover portion, the cover portion is formed by setting the stator core in a mold and injecting a resin into the mold.

18. The manufacturing method of the motor according to claim 16, wherein, in the forming step of the cover portion, a first constituent portion is formed by setting the stator core in a first mold and injecting a resin into the first mold, and a second constituent portion is formed by setting the stator core in a second mold and injecting a resin into the second mold.

* * * * *